INVENTORS
STANLEY FRED FORMAN
JOHN THIEDE

ATTY.

3,389,029
METHOD OF MAKING TRANSPARENCY
Stanley Fred Forman, Chicago, and John Thiede, Mount Prospect, Ill., assignors to Black Box Collotype Studios, Inc., Chicago, Ill., a corporation of Illinois
Filed June 23, 1964, Ser. No. 377,227
1 Claim. (Cl. 156—3)

ABSTRACT OF THE DISCLOSURE

A method is disclosed for making color transparencies for use in a projection machine so as to project an enlarged image on a screen without minor flaws in light and color transmission. The method includes the steps of etching a transparent plastic base to roughen the same, applying pigment in whole-tone to form the desired image, applying a laminating adhesive layer to cover both the pigment and the exposed roughen surface to render said roughen surface more transparent, and finally applying a transparent cover layer upon the adhesive layer to form a laminate and seal the assembly.

---

This invention relates to a method of making transparencies. Particularly the invention relates to a method of making color transparencies. Specifically the invention relates to a method of making a transparency in which a colored picture and the like is formed and is adapted to be projected through an enlarging lens onto a focusing or projection surface to provide an enlarged picture in color.

The usefulness of transparencies such as lantern slides and the like as an adjunct to teaching is well known. However, use for that purpose, especially in large auditoria has been limited to colorless slides, primarily because no color transparency of the quality required for great magnification heretofore has been made available in a manner to permit or encourage extensive use of color transparencies.

It is appreciated, of course, that color transparencies, if available, would permit teaching of subject matter not adapted for colorless transparencies. Additionally, it would enhance effects of teaching subject matter adapted for colorless transparencies. For example, in teaching geography, a projected map with differently colored countries would be more effective than a plain black outline or colorless map merely showing the political boundries of the various countries.

While colored transparencies of suitable quality heretofore could be made available for use in conventional lanterns, such transparencies were exceedingly costly by reason of which use thereof was limited. Furthermore, such color transparencies, though adapted for projection by a conventional lantern over relatively short distances, were not adapted for projection in a large auditorium, for example, over a long distance.

Additionally, conventional lanterns were not adapted for projection over long distances and accordingly had applications limited to small groups of persons.

Recently in the art, endeavors at overcoming some of the inadequacies of the conventional slide machines or lantern devices for projection across a long distance have resulted in development of new, and improvement of former devices, some of which are known as overhead projectors. The recently developed long-range projectors are adapted to cast the image of a transparency on ceiling or wall. They include a lens system which is capable of magnifying a picture carried on a transparency to the extent that it is visible in a massive lecture hall, for example, in which there may be a thousand, or more, students.

While projected images obtained in black and light or colorless are exceedingly good upon projection by new long-range projectors, the pace of development, heretofore, of color transparencies, has not kept abreast of the development of the projectors. As a consequence, until this invention, deterrents to widespread employment of color transparencies remained, notwithstanding the recent adequacy of projectors.

The problems stem from employment, in commercial color printing of transparencies of the described class, of non-full tone processes, such as the half-tone process. The half-tone process is known as the dot method of printing; and in color printing, only spaced apart pigment carrying dots transfer, print or apply the pigment to a transparency. When the dot printed image of such transparency is magnified, upon projection, through a lens system of a long-range projector, the spaces between the dots are also magnified.

The spaces between the dots have no color. As a result, the projecting light leaks through the colored areas or around the colored dots. Consequently, upon focusing of the image thus projected, an undesired picture is produced as the colored areas do not appear solid.

Silk screening or lithography, though full-tone processes, appear not to be satisfactory processes at the present time for coloring transparencies, inasmuch as the thickness of the pigments that are applied upon transparencies by such processes cannot be adequately controlled. By reason of such inadequate control, pigment may be applied to heavily. As a result light from a projector will be blocked by the pigment and will not pass through the colored areas. When that occurs of course, the colored areas on a transparency appear as black upon focusing of the image because they have blocked the passage of light.

To provide desirable quality in a color transparency adapted to be magnified greatly, it is essential that each and all pigments applied on a transparency give the impression of continuous uninterrupted color in corresponding segments of the projected image. Additionally, the thickness of the pigment on a transparency must be controlled to permit a sufficient passage of light through its colored sections, whereby the resulting image appears colored. Furthermore, the means applying the various pigments must insure suitable or adequate color registration; that is to say, each pigment should be applied on the transparency precisely within its intended area and in proper relationship to the remainder of the transparency and any other pigment thereon.

It is an object of this invention to provide an improved process for making transparency.

It is an additional object of the invention to provide an improved process for making color transparency.

It is a further object of this invention that each pigment on the transparency appear highly magnified as a corresponding color upon projection and in continuous tone.

It is a further object of the invention to provide means integral with the transparency whereby it is preserved and the pigmented areas protected and sealed.

A yet further object of the invention is provision of an improved method for applying pigment to the transparency and sealing said pigment without distortion of optical qualities.

These and other objects, features and advantages of the present invention will be apparent upon consideration of the following description and appended claim, when considered in conjunction with the accompanying drawings, wherein the same reference character or numeral refers to like or corresponding parts throughout the several views.

On the drawings:
FIG. 1 is a sectional view showing a preferred form of transparent base prior to commencement of the process.

Referring now more particularly to the invention, the article or thing to be copied or the ultimate picture of that which is required is referred to as a model or original. The model or original may be any article which can be copied photographically, such as a separated positive film, hand art work, or wash art work, ektachrome, or mat material.

Figure 5:
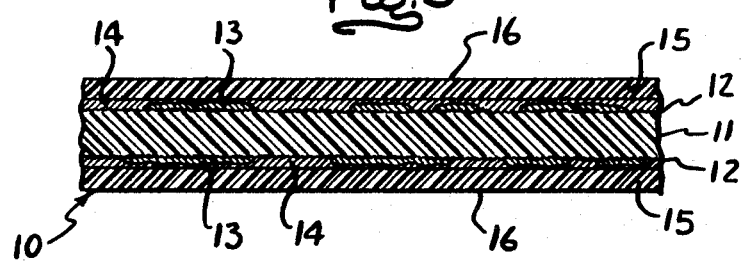
FIG. 5 is a sectional view illustrating the addition of laminations to the product shown in FIG. 4, and embodying a preferred form of the invention.

One reason for employment of a photographic process in manufacture in accordance with the instant invention is to facilitate suitable color registration in the transparency generally designated as 10 in FIG. 5.

From the model or original, a plurality of separation negatives are made in the conventional fashion. That is, by employing appropriate color filters, a plurality of negatives are prepared, each of which is identical with the other, except that from each selected color has been occluded. Generally the separation is on the basis of red, yellow, blue and black. However, any desired color may be individually separated on a respective negative through the employment of a suitable color filter in the negative preparation.

The separations are then masked in any conventional fashion; and each separation is exposed on a photo-gelatinized or collotype plate. A collotype plate is basically an aluminum plate that has been grained and coated with a gelatinized photosensitive solution. As the light passes through each exposed separation, the area of such separation corresponding to the color initially filtered will permit the passage of light to the respective photo-sensitized or collotype plate causing thereon a photo-chemical reaction in an area corresponding to the area covered by the color filtered out in its separation negative.

Thereafter, each exposed collotype plate is washed and dried; and subsequently etched in a glycerine solution in a conventional fashion. Accordingly, there are produced etched plates with raised areas corresponding to the various colors originally filtered out.

In practice, it has been found preferable to make several etched collotype plates corresponding to each color. Additionally, it is preferable that the negatives which are produced by approximately eight inches by ten inches, inasmuch as modern long-range and overhead projection devices, as well as others expected to be manufactured hereafter, accommodate transparency frames which do not exceed eight and one-half inches by eleven inches.

The etched collotype plates are employed as printing plates. Each etched plate is adapted to print or apply a pigment on a base or article 11 which is illustrated in the drawings. The printing of plate 11 is in an area corresponding to the raised or printing surface of such plate. By applying to each printing of raised collotype surface the pigment corresponding to its respective area, an article can be reproduced in color photographically. Customary printing techniques for applying succesive pigments to base or article 11 with succesive etched plates in registration may be employed.

While photographic techniques and devices are employed to insure proper color registration, such are not to be regarded as limiting as other equivalent techniques and devices will undoubtedly be evident. And though proper registration is a requirement of a quality color transparency, the details of the technique and means for color printing and registration on a photo-transparent base are not a concern of this application.

What is significant however, is that the printing process herein described is preferably a continuous tone process; that is to say, in the preparation of the etched plates, it is desirable that conventional dots and lines employed in color printing are not used. Thereby, upon projection of transparency 10 there will be no colored dots or lines between which light can leak to spoil the visual effect. Furthermore, it is imperative that the thickness of each pigment be controlled so as not to block passage of the projecting light. Should pigment be applied too heavily or thickly upon the transparency base 11, such pigment will completely block the passage of light to cause such area to appear black upon projection. As pigments of varying composition are and will be adapted for employment within the framework of this application, no precise range of pigment thickness will be set forth because tolerable range or limits of thickness for pigments will vary with compositions. Skilled operators will become cognizant of the tolerances by experience.

The color printing is done on any suitable transparency base 11 which is itself transparent. The base 11 may be fabricated from any transparent rigid or semi-rigid plastic such as acetate, or even glass if desired. Color printing of each color employing the photo process or collotype method hereinbefore described, or any equivalent fulltone proces may be done on two sides of a flat transparency base simultaneously in one operation with a single set of plates in any well known or conventional fashion known in the art. One suitable material for use as a transparency base 11 is referred to by those skilled in the art as "600 W" acetate sheeting of .0075 thickness.

It is desirable that the surfaces of the transparency base 11 be conditioned or treated in any of several manners known in the art to insure suitable pigment acceptance and retention thereby as color printing upon untreated surfaces of glass or plastic materials generally results in undesirable products by reason of poor pigment acceptance and retention. If color printing is on a polyethylene base, for example, the surface to be printed can be subjected to a corona discharge for conditioning. Suitable chemicals can also be used to enhance pigment reception and retention to the base or plate 11.

When using the preferred acetate sheet transparency, good results in retention of pigment 13 are obtained by chemically treating both sides of the acetate base 11 with a composition known in the art as "600 W White Coating." This material etches the therewith treated base 11 to provide roughened surfaces 12, as illustrated in the drawings. Said etching composition comprises various resin varnishes, approximately one-third calcium carbonate, one-third magnesium silicate and about one percent of bentonite clay.

After a transparency 10 is printed and a proper interval has elapsed to permit all the pigments 13 to dry, the thusly colored sheets are sealed, preferably hermetically by applying a transparent lamina 15 to each face over pigment 13. Laminae 15 of various fabrications will be found suitable. Preferably laminae 15 should be optically compatible with base 11. A one and one-half mil, transparent acetate sheet is satisfactory for the described embodiment. One thereof disposed against each printed surface provides, in normal use, a virtually indestructible transparency 10.

Furthermore, the outer faces 16 of laminae 15 can be written or drawn on for instructional purposes with suitable marking implements. Any applied indicia, legend or other written material, and the like can be readily wiped from surfaces 16 without marring or in any way defacing the pigment 13 or for that matter anything disposed between the inner surfaces of the laminae 15.

Figure 1:
Figure 2:
FIG. 2 is a sectional view illustrating the base shown in FIG. 1 after treating the surface of pigment retention.
Figure 3:
FIG. 3 is a sectional view illustrating the treated base shown in FIG. 2 after pigment addition.
Figure 4:
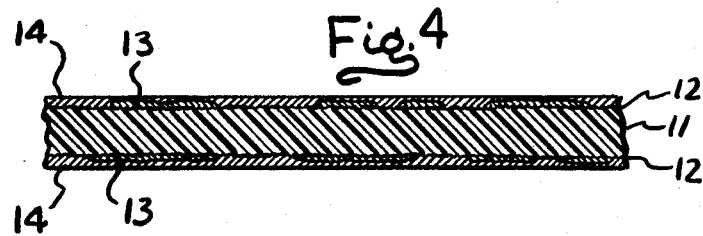
FIG. 4 is a sectional view illustrating the pigmented base shown in FIG. 3 after addition of adhesive.

The roughening of surface 12, as illustrated in FIGS. 2 and 3, produces a frosting or opacity in the base or plate 11 by reason of diffusion of light as it hits the roughened acetate surfaces 11. But, it is by reason of the roughening or etching of the surface 11, in the manner aforesaid, that pigment 13 suitably is accepted and retained. By employing, in the illustrated embodiment, a transparent acetate laminating adhesive 14, as illustrated in FIGS. 4 and 5, disposed between laminae 15 on the entire surfaces 12 and over pigment 13, all of the uneven surfaces are filled in. It is preferable that the refractive and other optical characteristics of the adhesive 14 are substantially the same as that of the transparency base or plate 11 and of the laminae.

By thus filling in between the roughened surfaces with a suitable material, the aforesaid frosty or opaque appearance will disappear because the irregular surfaces responsible for the frosted appearance have been covered. Now any suitable filler for this purpose may be employed. A film of clear oil, for example, will reduce the opacity.

However, by employing a transparent acetate a dual function is served, firstly, that of eliminating opacity due to chemical frosting and secondly, that of acting as a bond for laminating sheets 15.

The herein described invention provides a practically perfect color transparency for long-range projection. Furthermore, it reduces color transparency costs more than fifty percent over the cost of conventional and less suited devices. Because of the invention, rapid growth in the industry comprising this art has been, is being and will hereafter be experienced.

What is claimed is:

1. A process for making large color transparencies for use in a projection machine to project an enlarged image on a screen, wherein minor flows in light and color transmission in the transparencies are greatly magnified upon the screen, comprising the steps of chemically etching the surfaces of a transparent plastic base to roughen the same thereby causing said surface to accept and retain pigment layers of transparent thickness, applying to said surface in whole-tone said pigment layers to define the representation to be projected, applying thereafter a uniform transparent acetate laminating adhesive layer to cover both the roughened surfaces of the base, to render it more transparent, and the pigment layers, and finally applying a transparent cover layer over the adhesive layer to seal the final assembly.

References Cited

UNITED STATES PATENTS

| | | | |
|---|---|---|---|
| 2,115,409 | 4/1938 | Casto | 161—6 |
| 2,362,980 | 11/1944 | Ball | 161—6 |
| 2,977,845 | 4/1961 | Boone | 161—3 |
| 2,073,387 | 3/1937 | D'Andrea | 156—241 XR |

FOREIGN PATENTS 226,551   5/1925   Great Britain.

ROBERT F. BURNETT, *Primary Examiner.*

ALEXANDER WYMAN, JACOB H. STEINBERG,
*Examiners.*

W. M. POWELL, *Assistant Examiner.*